3,128,312
GLYOXYLYLBENZOPHENONE DERIVATIVES
William H. Edgerton, Strafford-Wayne, Pa., assignor to Smith Kline & French Laboratories, Philadelphia, Pa., a corporation of Pennsylvania
No Drawing. Filed June 27, 1960, Ser. No. 38,770
7 Claims. (Cl. 260—591)

This invention relates to new glyoxylylbenzophenone derivatives having antiviral activity. More specifically, these compounds have antiviral activity for instance against various viruses such as distemper virus, influenza virus (PR8), hepatitis virus (MHV$_3$), neurotropic virus, Newcastle disease, Coxsackie virus, Herpes simplex etc. The compounds of this invention also have utility as fixatives for perfumes, such as in the manufacture of soaps.

These glyoxylylbenzophenone derivatives are represented by the following basic formula:

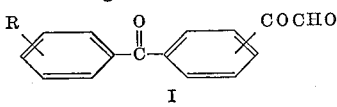

I in which R represents hydrogen or glyoxylyl (—COCHO). Also included in this invention are various molecular addition compounds formed by adding reactive molecules to the strongly binding glyoxylyl moieties in the compounds of Formula I such as the hydrates or alcoholates formed from aliphatic hydrocarbon alcohols of less than 6 carbon atoms for instance the ethylate or methylate addition products, said hydrates having the formula:

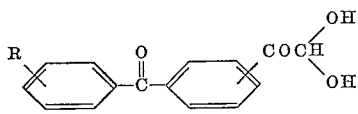

in which R is hydrogen or

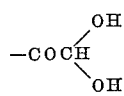

and said alcoholates having the formula:

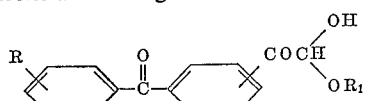

in which R is hydrogen or

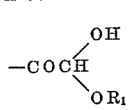

and R$_1$ is an aliphatic hydrocarbon moiety of less than 6 carbon atoms.

The advantageous compounds of this invention are those having glyoxylyl substituents in the para or 4 positions.

The benzophenone derivatives of this invention are prepared from the dihaloacetyl analogues by their reaction with sodium or potassium ethylate or methylate to form the methyl or ethyl acetals which are then hydrolyzed to the gyloxal derivatives or, preferably, from the acetyl analogues by direct oxidation with selenium dioxide.

Alternatively, acetylated diphenylmethane derivatives can be oxidized with selenium dioxide to form the glyoxylylbenzophenone end products in one oxidation step.

The acetylated benzophenone intermediates useful as intermediates for preparing the glyoxylyl compounds are either known or are prepared by methods well-known to the art. For instance, the acetyl compounds can be prepared by oxidation of the known ethylbenzophenone congeners using potassium permanganate and a magnesium salt in an aqueous medium according to Harms, Rec. trav. chim., 73, 892 (1954) or by treating the known benzophenone acid chloride congeners with dimethyl cadmium according to Zelinski, J. Am. Chem. Soc., 73, 5521 (1951). The 2-haloacetylbenzophenones cannot be converted into the glyoxylyl end products because of a tendency to cyclize by condensation.

The molecular addition compounds are prepared by reacting the parent glyoxylylbenzophenone with water or an alcohol either in excess or in a miscible organic solvent. The glyoxylyl parent can be regenerated from the addition compound by heating, usually in vacuo.

The following examples are not limiitng but are designed to illustrate the novel aspects of this invention and to teach one skilled in the art to practice this invention. It will be obvious that conventional substitution such as halogen or methoxyl groups on the phenyl rings of the compounds of this invention would lead to useful end products equally well. Such minor modifications are included in the scope of this invention.

*Example 1*

A mixture of 3.9 g. of selenium dioxide, 1 ml. of water and 15 ml. of dioxane is heated on the steam bath while 5.6 g. of 4'-acetylbenzophenone in 60 ml. of dioxane is added. After a reflux period of six hours, the hot reaction mixture is filtered and evaporated to give 4'-glyoxylylbenzophenone hydrate.

The hydrate is heated under vacuum in a drying pistol at 78° C. for ten hours to yield the free glyoxal. This compound (500 mg.) is heated at reflux in methanol. Evaporation gives the methylate addition products. The glyoxal (500 mg.) heated on the steam bath in butanol gives upon evaporation in vacuo the butylate.

*Example 2*

A mixture of 10 g. of 2,2'-diethylbenzophenone [Ann., 594, 214 (1955)], 15 g. of potassium permanganate, 15 g. of magnesium nitrate and 100 ml. of water is heated for 30 hours at 80–85° C. An excess of oxalic acid solution is added to destroy the unused permanganate. The oxidation sludge is extracted several times with benzene. Drying and evaporating the organic solvent gives the desired 2,2'-diacetylbenzophenone.

A mixture of 2.7 g. of the diacetyl derivative, 2.3 g. of selenium dioxide and 100 ml. of anhydrous dioxane is heated at reflux for ten hours, filtered hot and evaporated to give the desired 2,2'-bisglyoxylylbenzophenone. This compound (750 mg.) is dissolved in anhydrous ethanol and evaporated on the steam bath to give the ethylate addition product. Another portion of the parent compound (500 mg.) is heated in aqueous dioxane. The hydrate is isolated by evaporation.

*Example 3*

A mixture of 2 g. of 2-acetylbenzophenone, 2.8 g. of selenium dioxide and 50 ml. of aqueous dioxane is heated at reflux and worked up following the procedure of Example 1 to give 2'-glyoxylylbenzophenone hydrate.

*Example 4*

A mixture of 5 g. of 4,4'-diacetyldiphenylmethane, prepared by the Friedel-Crafts reaction using diphenylmethane, acetyl chloride, aluminum chloride and carbon disulfide, M.P. 92–94° C., 7 g. of selenium dioxide and 75 ml. of anhydrous dioxane is heated at reflux for 12 hours. The mixture is filtered hot. The filtrate is evaporated in vacuo. The residue, crude 4,4'-bisglyoxylylbenzophenone, is purified from ethanol to give the ethylate. This compound is heated in a drying pistol at 100° C. in vacuo to give the free glyoxal which is converted to the hydrate in aqueous dioxane.

What is claimed is:

1. A chemical compound selected from the group consisting of: (1) a glyoxylylbenzophenone having the structural formula:

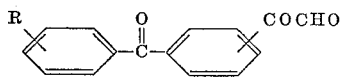

in which R is a member selected from the group consisting of hydrogen and glyoxylyl; (2) hydrate addition compounds thereof having the structural formula:

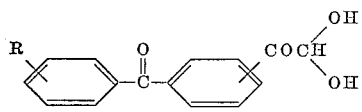

in which R is a member selected from the group consisting of hydrogen and

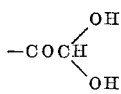

and (3) alcoholate addition compounds thereof having the structural formula:

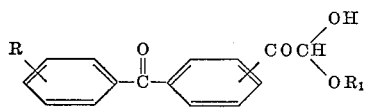

in which R is a member selected from the group consisting of hydrogen and

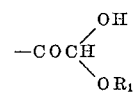

and $R_1$ is an aliphatic hydrocarbon moiety of less than 6 carbon atoms.

2. A chemical compound having the structural formula:

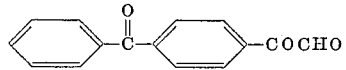

3. A chemical compound having the structural formula:

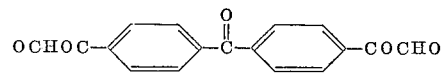

4. 4-glyoxylylbenzophenone hydrate.
5. 4-glyoxylylbenzophenone methylate.
6. 4,4'-bisglyoxylylbenzophenone hydrate.
7. 4,4'-bisglyoxylylbenzophenone ethylate.

References Cited in the file of this patent

Munsante et al.: Gazz. Chim. Ital., vol. 80, pages 868 and 875 (1950).